United States Patent
Attar et al.

(10) Patent No.: US 6,734,858 B2
(45) Date of Patent: May 11, 2004

(54) METHOD AND APPARATUS FOR USE OF COMPUTER AGING TO DEMONSTRATE A PRODUCT BENEFIT

(75) Inventors: Paul S. Attar, Hawthorne, NJ (US); Gopinathan K. Menon, Wayne, NJ (US); David Pranitis, Englewood, NJ (US)

(73) Assignee: Avon Products, Inc., New York, NY (US)

( * ) Notice: Subject to any disclaimer, the term of this patent is extended or adjusted under 35 U.S.C. 154(b) by 299 days.

(21) Appl. No.: 09/748,993

(22) Filed: Dec. 27, 2000

(65) Prior Publication Data

US 2002/0097251 A1 Jul. 25, 2002

(51) Int. Cl.⁷ .................................................. G06T 13/00
(52) U.S. Cl. ....................................................... 345/475
(58) Field of Search ................................. 345/475, 473, 345/646; 600/410

(56) References Cited

U.S. PATENT DOCUMENTS

| | | | |
|---|---|---|---|
| 5,781,650 A | | 7/1998 | Lobo et al. |
| 5,818,457 A | | 10/1998 | Murata et al. |
| 5,850,463 A | * | 12/1998 | Horii ........................... 345/646 |
| 5,867,171 A | | 2/1999 | Murata et al. |
| 2001/0053347 A1 | * | 12/2001 | Varani et al. .................. 424/59 |

OTHER PUBLICATIONS

Wu et al ("Skin Aging Estimation by Facial Simulation": Computer Animation Proceedings: 1999).*

Pieper et al ("Interactive Graphics for Plastic Surgery": 1992 ACM 0–89791–471–1–6/92/003/0127).*

* cited by examiner

Primary Examiner—Almis R. Jankus
(74) Attorney, Agent, or Firm—Ohlandt, Greeley, Ruggiero & Perle LLP

(57) ABSTRACT

The present invention includes a method and a system for progressively aging an image a first predetermined period of time, and a second predetermined period of time, and outputting the resultant, progressively aged images to show an individual the personalized benefits that they might expect to realize by using a personal care product. Thus, there is an output that is personalized and unique to each user of the system. The present invention also provides a method and a system for developing new personal care products.

35 Claims, 2 Drawing Sheets

METHOD AND APPARATUS FOR USE OF COMPUTER AGING TO DEMONSTRATE A PRODUCT BENEFIT

BACKGROUND OF THE INVENTION

1. Field of the Invention

The present invention relates to the sale of personal care products. In particular, the present invention relates to a system for selling a skin care product that uses computer processing means to demonstrate immediately the prospective benefit of the product to the user.

2. Description of the Related Art

Computer imaging software and systems have been used by some Federal and state law enforcement agencies to artificially age individuals. For those law enforcement agencies, the computer imaging technology is conventionally used in cases to age either a suspect or a victim when a current photograph of that person is not available. Computer aging has been found particularly useful in cases involving missing children. A child's face changes dramatically during his or her rapid growth and development from childhood to early adulthood. Thus, it is necessary to age the child, especially if a year or so has passed since the time the child has become missing.

Computer imaging programs have also been used to allow a person to undergo a "virtual makeover". Typically, a virtual makeover involves "applying" virtual makeup to an image of the person or to a composite image created and displayed by the imaging program. In essence, a mask of various types and colors of makeup is superimposed onto an image of the person's face.

Plastic surgeons have also used computer imaging. Basically, the surgeons attempt to show a patient how his or her face might be altered as a result of plastic surgery.

It is important to emphasize, however, that prior art virtual make-overs did not alter or modify the physical or biological (i.e., dermatological) characteristics of a person's face.

The passage of time will bring about changes to an individual's face. Such changes are due, for example, to facial aging. Facial aging often manifests itself in a loss of elasticity and a sagging of the facial skin, as well as an increase in the number and severity of facial lines and wrinkles.

It is also well known that sun exposure is one of the most damaging influences on the skin. Despite this well-known fact and the deep-rooted dislike an individual has for wrinkled skin, most people nonetheless engage in skin damaging pursuits, such as tanning. Even casual daily UV exposure can result in substantial cumulative photodamage. Yet a great many people also forego using currently available products, such as sunscreens, that can block or minimize the damaging effects of the sun. Smoking and having little or no skin care regimen can also hasten the decline of the aesthetic appearance of skin, especially on the face.

A major factor for neglecting skin care maintenance is that facial aging and the cumulative damaging effects of sun exposure, smoking and pollution are not instantaneously and visually evident to the user. Likewise, the long term benefits of using skin care products are not immediately appreciated. Since the effects of facial aging and sun damage to skin tend to be perceived slowly, it is difficult for a person to visualize gradual changes to his or her skin, let alone foresee the cumulative long term effect of such gradual changes. Thus, it is believed that a person must be visually confronted with the results of continual skin care neglect in order to persuade the person to use a preventive skin care product.

SUMMARY OF THE INVENTION

It is an object of the present invention to provide a system that immediately demonstrates a prospective benefit obtained by using a skin care product.

It is another object of the present invention to provide such a system to demonstrate the personal care product benefit by the use of an electronic interface, either at a point of sale or via a communications network.

It is still another object of the present invention to provide a method for demonstrating how a person might uniquely and individually benefit from the use of a skin care product due to his or her own individual skin type and/or lifestyle.

It is a further object of the present invention to provide such a system that progressively ages an image of a person's face a first predetermined period of time, regressively ages the face image to a second predetermined period of time, and outputs the aged images of the face.

These and other objects and advantages of the present invention will be achieved by a system and/or method for aging an image to demonstrate a benefit of using a personal care product. The method comprises the steps of: establishing a first predetermined period of time based on at least one aging factor, progressively aging an original image said first predetermined period of time and outputting a first aged image; establishing a second predetermined period of time by modifying said first predetermined period of time based on at least one skin aging decelerating factor associated with one or more skin care products, and progressively aging said original image said second predetermined period of time and outputting a second aged image. The method also preferably includes regressively aging said first aged image to arrive at said second aged image.

The output of the method and system is provided to show an individual the personalized benefits that they might expect to realize by using a skin care product. Further in accordance with the above-stated objectives, a skin care product provider can use the system and method of the present invention to develop products for areas of facial aging identified as being inadequately addressed by existing products.

While the present invention will be discussed primarily in the context of aging skin and skin care products, it will be appreciated by those skilled in the art that the present invention is useful for demonstrating the benefits of other personal care products, such as for hair and nails, and products targeting health and well-being to improve the appearance and health of a person notwithstanding the particular cause of the aging. Therefore, the present invention can be adapted to a number of applications.

DETAILED DESCRIPTION OF THE INVENTION

The method described herein demonstrates how an individual's appearance can be expected to change over a period of time. The period of time is preferably variable and selectable. The present invention provides personalized results most pertinent to the individual. Furthermore, the method of the present invention can be adapted to identify and focus on the specific areas of the face affected by a particular product. In this aspect, the method can also be used to identify areas of an image not affected by a product. This aspect of the invention may also be useful in aiding the development of new products.

Thus, the present inventive method is useful in educating consumers and demonstrating the damaging effects of certain aging factors on the skin (i.e., daily incidental sun exposure, stress, smoking, pollution, etc.) and the beneficial effects of preventative skin care including the use of a particular skin care product. The inventive method utilizes an electronic interface to chronologically demonstrate skin aging changes instantly and realistically, although the changes will actually occur over an extended period of time. The skin is not merely being masked in the present invention. Moreover, the method and system of the present invention allow an individual to immediately visualize how his or her aging appearance over a particular period of time can be improved with the use of one or more personal care products. In this manner, the invention provides an almost instantaneous and convincing selling point.

Figure 1:
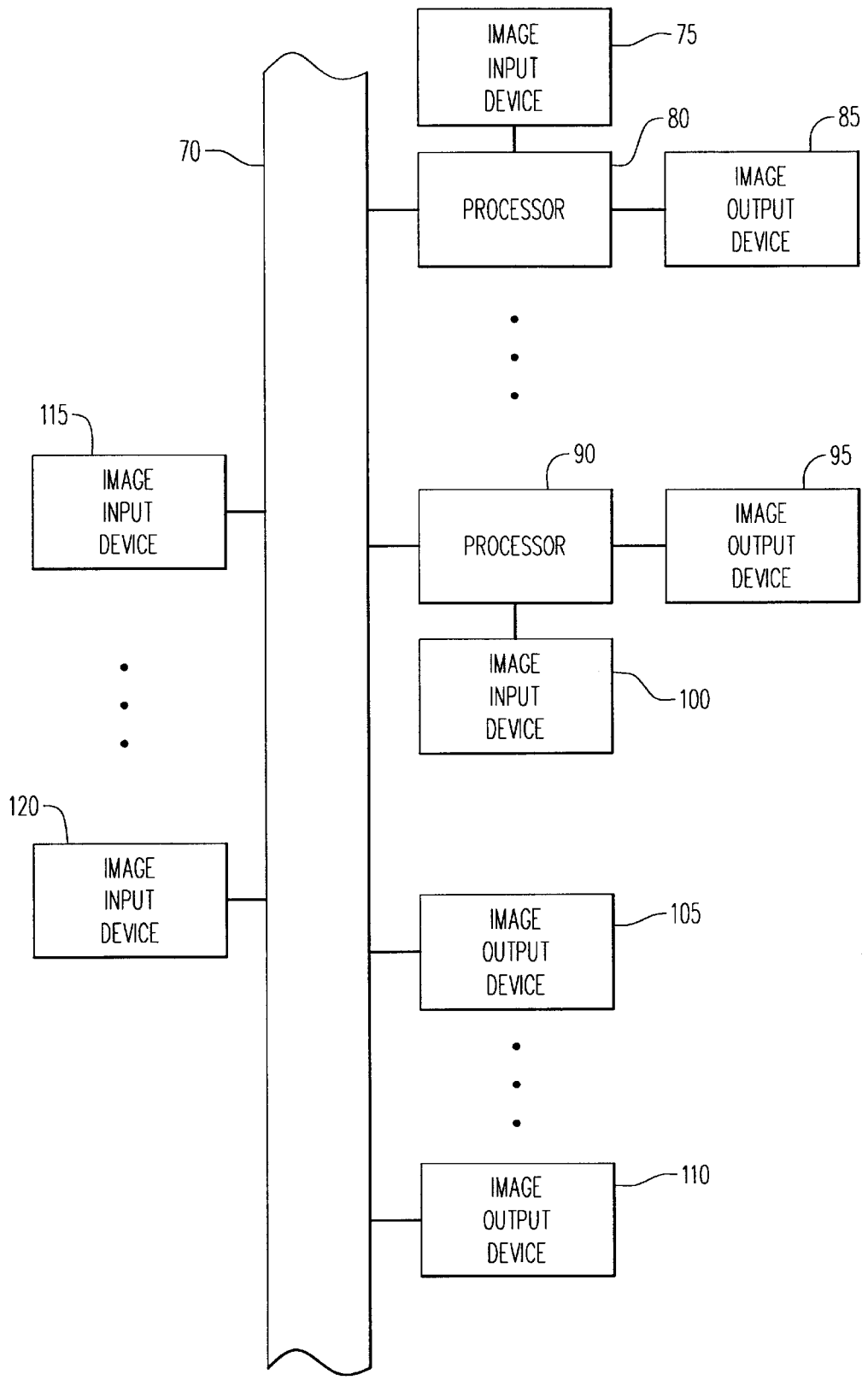
FIG. 1 is an overall block diagram of a system embodying the present invention.

Referring to the figures and, in particular, to FIG. 1, a system according to the present invention is generally represented by reference numeral 1. The system 1 includes a communications network 70, a processor 80 interfaced with the communications network, one or more image input devices 75, 100, 115 and 120, and one or more image output devices 85, 95, 105 and 110.

The processor 80 can be a general purpose personal computer having sufficient capacity to implement the method of the invention. The processor 80 need not be a dedicated device configured solely to carry out the present invention, though this too is a possibility. In order to provide individualized results and demonstrations for each user of the invention, a photo image of an individual is entered into the system 1 and processor 80 by using an image input device, such as image input device 75. The image input device 75 can be a variety of devices, for example, a scanner, a digital camera (still or video), a hand-held personal digital assistant equipped with a digital camera and wireless modem, or any other device or system capable of providing images suitable for use by the system 1. The image input device, although depicted as a separate device in FIG. 1, can be incorporated into other components, including components and devices not shown in FIG. 1.

In order to provide convincing evidence of the benefits that can be realized by using a particular product, an image output device, such as image output device 85, is provided and is shown connected to processor 80. The image output device 85, is typically a display device such as, for example, a computer monitor having a video screen for displaying the image or a printer for printing the image. Notwithstanding the particular image output device used, the image output device 85 can provide an output of the image either or both pre-processed and post-processed by processor 80 in order to demonstrate the benefits gained (or not gained) by using (or not using) a particular personal care product. In this manner, a "before" and "after" image can be provided of an instant, realistic tangible and personalized demonstration of the preventive and or corrective benefits gained by using a particular personal care product.

Although processor 80, image input device 75, and image output device 85 of FIG. 1 are depicted as separate devices directly interconnected to each other for performing the present invention, various portions of the present invention can also be distributed to other components such as, for example, a processor 90, image input device 100, and image output device 95 over a communications network 70. The communications network 70 facilitates distributing various portions of the workload of the present invention to components and devices not directly coupled to each other. The communications network 70 can be a global network, wired or wireless, for providing a communication link between the components of the system 1. The communications network 70, or portions thereof, may include, but is not limited to, a LAN or a WAN, for example, the Internet. For example, image input device 75 can be used to acquire an image of an individual, co-located processor 80 directly coupled to image input device 75 can be used to perform the "aging" of the image, and image outputting instructions can be dispatched to remotely located image output device 105 over communications network 70 to provide, for example, a printout of the processed image.

As FIG. 1 illustrates, the image input device can be connected directly to the processor, as is the case with 75 and 80, respectively, and 100 and 90, respectively, or directly to network 70, as is the case for image input devices 115 and 120. Likewise, the image output device can be connected directly to the processor, as is the case with 85 and 80 respectively, and 95 and 90, respectively, or directly to network 70, as is the case for image output devices 105 and 110. Also, all of the components may be interconnected over a wired or wireless network, or a combination thereof.

Figure 2:
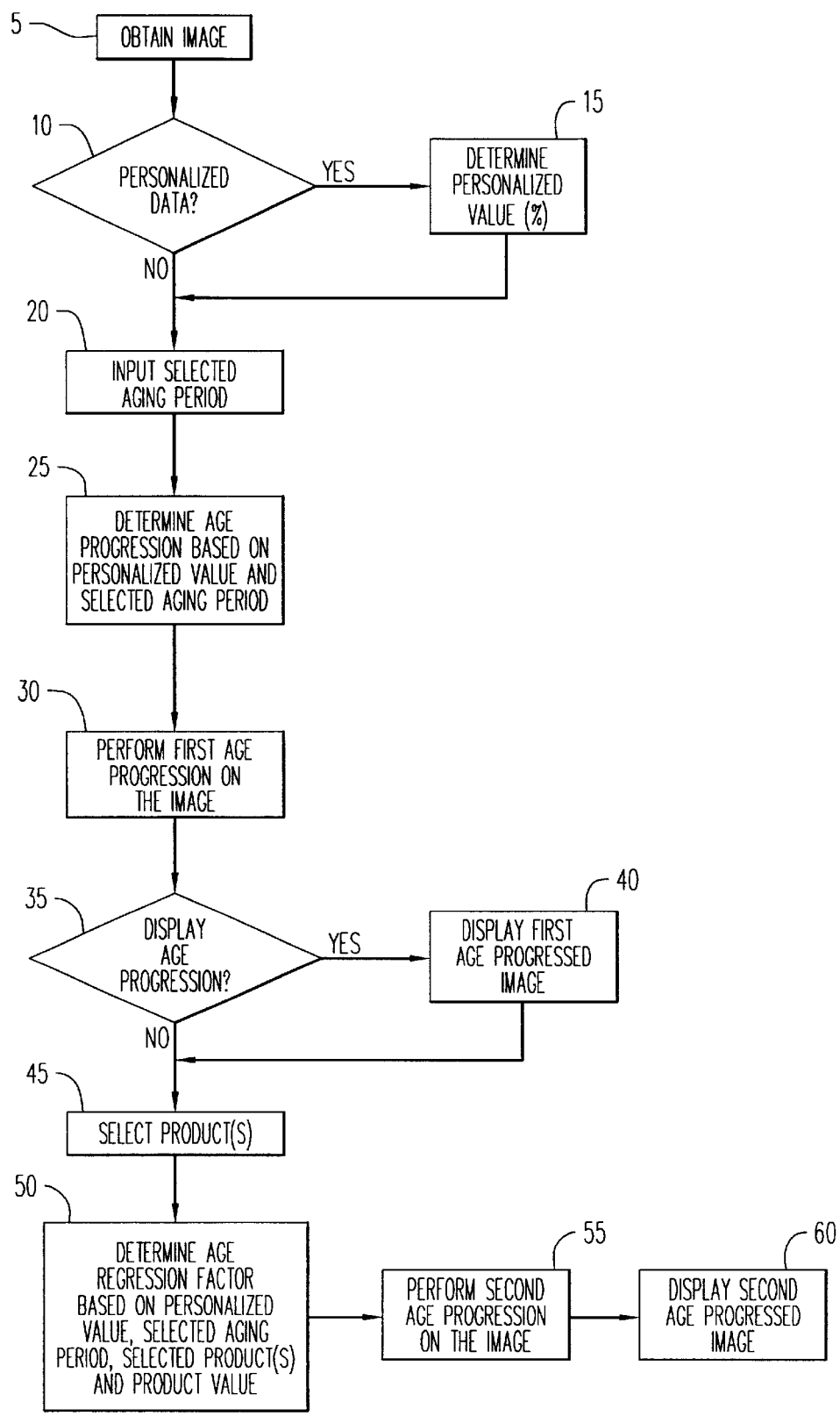
FIG. 2 is a logical flow diagram illustrating a method of the invention of FIG. 1.

With reference to the logical flow diagram of FIG. 2, an image of an individual is entered into the system of the present invention as shown in step 5. The image will facilitate a personal, individualized demonstration of the benefits that can be realized by such individual. The image is preferably a current facial photograph of the individual. The photograph, and thus the image, is typically scanned into system 1 of FIG. 1 and digitized for further processing. For example, the image can be a current photograph or a photograph of the individual at a known age that therefore requires processing to the present or, more preferably, to a future age. The image can also be entered into the system directly from an electronic file located on a disk 125, a CD-ROM 130, or other digital storage device or remotely located and accessed over communications network 70.

The image can also be acquired for processing by the system 1 using an imaging device, such as, for example a digital camera located at a skin care product point of sale. The image of the individual can also be acquired for processing by the system 1 using, for example, a "web" camera located in the individual's home and transmitted to a web site (or other processing location) for processing using communications network 70.

In order to provide an individualized demonstration that is uniquely reflective of the benefits that can be realized by the present invention, Personalized Data is collected for the individual in step 10. The Personalized Data typically includes criteria about the individual that can affect the health and appearance of the individual's skin. Typically, the Personalized Data includes information about the individual such as, for example, whether the individual is a sunbather, an exerciser (and if so, how often), or a smoker; whether the individual has any diseases or other health ailments that may impact the skin (e.g., circulatory problems); the individual's ethnicity, work and living environment, etc. As shown from the above short list of illustrative examples, the Personalized Data has either an aging affect on an individual's skin (Skin Aging Data) or anti-aging affect on the individual's skin (Skin Anti-Aging Data) depending on the answers provided by the individual.

Skin Anti-Aging Data will slow facial aging, whereas Skin Aging Data will expedite the facial aging process. Skin Aging factors are the lifestyle parameters that are provided by individuals and used by the present invention in calculating the degree of aging to attribute to an individual's image. Some examples of aging factors include, but are not limited to, sun exposure, heredity, and pollution, stress, and cigarette smoke exposure. Skin Anti-Aging factors are the lifestyle parameters that are provided by individuals and used by the present invention in calculating the degree of protection from aging, i.e., age reversal. Some examples of anti-aging factors include, but are not limited to, diet, exercise, skin care regimen, and vitamin intake. Skin Anti-Aging factors may also include age reversal attributable to product use.

If it is determined that Personalized Data is available for the individual in step 10, then a Personalized Value is determined for the individual in step 15. The Personalized Value is positive for a composite Personalized Data having a cumulative positive affect on the skin (i.e., Skin Anti-Aging Data) and negative for a composite Personalized Data having a cumulative negative affect on the skin (i.e., Skin Aging Data).

A time period by which the image input into the system will be aged is then entered into the system in step 20. The time period is preferably variable and selectable. In this manner, the process can be controlled to obtain results that are of the most interest to the individual. The time period can typically vary from a minimum of two weeks upward to 80 years. This range is illustrative and, as such, may be varied in various aspects of the present invention. However, in the case of, for example, hair care products, the selected aging period can be as little as several hours.

Based on the Personalized Value (if any) determined in step 15 and the selected aging period provided in step 20, an age progression factor is determined in step 30 by the processor 80. A first aged image is determined by using equations to calculate the necessary aging of the face image. A typical image will represent a composite of several different equations, each equation targeted to a specific category of aging, such as fine lines, sagging skin, etc.

An equation for each category can be expressed with the general form:

$$\Sigma Aging_{(category)} = [\alpha\beta\delta(\text{Aging factor 1}) + \Phi(\text{Aging factor 2}) + \gamma(\text{Aging factor 3}) - \nu(\text{Anti-aging factor 1}) - \mu(\text{Anti-aging factor 2}) - (\text{Anti-aging factor 3}) \ldots ]$$

wherein:
- Category is a visually perceptible aging parameter such as fine lines, mottled pigment, crow's feet, dark circles under eyes, sagging skin, etc.
- $\alpha, \beta, \delta, \Phi, \ldots$ are multiplication constants that represent Personalized Data factors identified by an individual and influencing the various Aging and Antiaging factors, such as race, heredity, smoking, etc. For example, the Aging factor sun exposure will be less damaging to a person with darker skin than a person having lighter skin. Therefore, an individual with lighter skin will have a larger sun exposure multiplication factor than a person with darker skin. The multiplication constants may be unique to each Aging factor and Anti-aging factor.

Typically, the age progression factor is the combined result of the selected aging period and the Personalized Value. In a simplified form, the age progression factor is determined as:

Age Progression Factor=Selected Aging Period−(Selected Aging Period×Personalized Value). [a]

This is a simplified form of the age progression equation since, as disclosed above, the aging calculation has the general form of a summation of multiple equations.

The Personalized Value is typically expressed in a percentage where, for example, a negative Personalized Value of (−5%) represents a lifestyle that increases aging by 5%. Once the age progression factor is determined, step 35 progresses (i.e., ages) the image of the photograph. Preferably, the starting point, i.e. the starting age, of the age progression is the age of the individual in the captured image. This is normally a known value. The age of the individual in the image can be provided at the time the image is obtained in step 5 or can be provided as part of the Personalized Data in step 15. If the starting age is not known, then an assumption or an approximation of the starting point is made. The actual image aging performed in the present invention is typically accomplished by an image aging computer program that uses very sophisticated algorithm(s) to determine how a person will age over time. The age progression factor listed above is typically used by the sophisticated age imaging program of the present invention to account for the Personalized Data and the desired aging period.

A determination is then made in step 35 whether the age progressed image will be output for viewing by the individual. If it is determined to display the age progression, then the age progressed image is displayed in step 40. After the display of the age progression, the method of the present invention proceeds to step 45. If it is determined not to display the age progressed image in step 35, the method of the present invention proceeds directly to step 45.

It is preferable to allow the individual to decide whether to display the age progressed image. This is because some individuals, particularly the elderly, may not want to see themselves looking years older. Other individuals, particularly teenagers, may want to see themselves as they will look when they are older.

In step 45, the individual, either alone or with the assistance of a skin care product provider, can select a product(s) to determine the effect the particular product will have on the appearance of the individual's skin. The provider can be a consultant, salesperson, or demonstrator of not only the product, but of the inventive method and system as well.

The provider may be in the same location as the individual, for example, in a store location, the individual's home or at a staffed kiosk located in an airport or mall. The provider may also be in a location remote from the individual, for example, in a store or office location, while the individual is located in his or her home, office, or at an unstaffed kiosk located in an airport or mall. Alternatively, the individual can remotely carry out the method and system of the present invention by communicating and simultaneously viewing the image via a communications network, such as the Internet, and/or by means of a wired or a wireless connection.

In step 50, an age regression factor is determined on the image. The age regression factor is typically based on the Personalized Value, the selected aging period, and the personal care product selected for use. In a simplified form, the age regression factor is determined as:

Age Regression Factor=Selected Aging Period−(Selected Aging Period×Personalized Value)−(Selected Aging Period×Product Value). [b]

The Personalized Value will have a negative value to indicate aging characteristics or a positive value to indicate anti-aging characteristics.

The Product Value in equation [b] above is the value corresponding to the anti-aging properties of each selected product. The anti-aging properties of each selected product is preferably known to a certain extent based on clinical research. The Product Value is typically expressed in a percentage where, for example, a Product Value of 10% represents a product that will decrease the selected aging period by 10%. The Product Value may depend on the length of time the product is used.

After the age regression factor is determined in step 50, the original image is again progressively aged in step 55 and displayed in the step 60. The second age progressed image is determined based on the starting age of the individual, the Personalized Data, the selected aging period, and the selected product. The second age progressed image can be displayed alone or in conjunction with the first age progressed image for a single output. The combined single output shows the individual how he or she will look at the end of the selected aging period using the selected product and how he or she will look at the end of the selected aging period without the use of the selected product.

As an example of the method depicted in FIG. 2, assume that a 35 year old, non-smoking, female construction worker living in the northeast United States uses the system and method of the present invention to determine whether the use of a particular skin care product will provide beneficial results to her appearance over a 5 year period. Assume a current photograph of the individual is entered into the system, a Product Value of 10% and a negative Personalized Value of (−5%). Therefore:

Age Progression Factor=Selected Aging Period−(Selected Aging Period×Personalized Value)=5−(5×(−0.05))=5.25 years The present invention will age the image by 5.25 years. Thus, the individual in this example will effectively look 5.25 years older after a passage of only 5 years. Using the selected product, the invention yields:

Age Regression Factor=Selected Aging Period−(Selected Aging Period×Personalized Value)−(Selected Aging Period×Product Value)=5−(5×(−0.05))−(5×0.10)=4.75 years The present invention will realistically age the image by 4.75 years. The individual in this example can instantly be presented with a display of herself looking only 4.75 years older after a virtual passage of 5 years with the use of the particular skin care product.

In one aspect of the present invention, the aged images obtained by the present inventive method and system may be presented to an individual in one or more particular aged image display sequences. The particular presentation order for displaying the aged images can be personalized to the individual's preferences. Alternatively, the particular presentation order for displaying the aged images can take into account marketing concerns. For example, an individual may be presented with their image aged, starting from today, a selected time period without the benefit of using a particular skin care product, and then presented with a display of their image aged, starting from today, the selected time period with the benefit of a particular skin care product.

An individual may also be presented with their image aged, starting from today, a selected time period without the benefit of using a particular skin care product (i.e., a first time period), and then presented with a their image regressively aged starting from the first aged time period to the selected time period with the benefit of a particular skin care product. This order of aged image displays may be used to demonstrate a particular skin care product's ability to "peel away" years of aging.

In another aspect of the invention, the individual can be presented first with the individual's image aged, starting from today, to a selected time period with the benefit of using a particular skin care product (i.e., a first time period), and from that aged image display be presented with their image progressively aged to the selected time without the benefit of the particular skin care product, and then regressively aged back to the selected time with the benefit of the particular skin care product. This sequence of aged image displays can be effective in demonstrating the benefits to be gained by using a particular skin care product by showing the individual how they can benefit from using the product, then how they might suffer if they do not use the product, and then leaving the individual with the lasting impression of how they will benefit from using the product.

As demonstrated by the results obtained in the above example, a skin care product provider using the system and method of the present invention can also identify specific areas of the face, for example pigmentation, lip lines, crow's feet, forehead wrinkles, etc, which may not be adequately addressed by the selected product. Moreover, the provider can use the present invention to suggest other beauty-related items, such as make-up, jewelry, and fashion accessories to enhance the appearance of the individual.

It should be understood that the foregoing description is only illustrative of the present invention. Various alternatives and modifications can be devised by those skilled in the art without departing from the present invention. For example, the age manipulated images may be output to a memory storage location (e.g., static ROM in processor 80 or a removable media storage device such as floppy 125 or CD-ROM 130); the actual algorithms used to age the input image can typically be more complex than the illustrative examples included herein based on proven software imaging and morphing techniques; the image may only undergo an age regression, including accounting for the selection of a particular product; and the output images may be presented in various configurations, such as a split screen view. Accordingly, the present invention is intended to embrace all such alternatives, modifications and variances that fall within the scope of the appended claims.

Wherefore we claim:

1. A method for aging an image via an electronic interface to demonstrate a benefit of using a personal care product, said method comprising the steps of:

establishing a first predetermined period of time based on at least an aging period;

progressively aging the image said first predetermined period of time to provide a first aged image;

establishing an anti-aging period of time associated with said personal care product;

establishing a second predetermined period of time based on at least said first predetermined period of time and said anti-aging period; and progressively aging the image said second predetermined period of time to provide a second aged image.

2. The method of claim 1, further comprising pictorially displaying said second aged image.

3. The method of claim 2, further comprising pictorially displaying said first aged image.

4. The method of claim 1, further comprising obtaining the image at a point of sale of said product.

5. The method of claim 1, further comprising obtaining the image through a communications network.

6. The method of claim 5, wherein the communications network is the Internet.

7. The method of claim 4, wherein said step of obtaining the image is facilitated through a device selected from the group consisting of a scanner, a camera, an electronic file transfer, and any combination thereof.

8. The method of claim 6, wherein said step of obtaining the image is facilitated through a device selected from the group consisting of a scanner, a camera, an electronic file transfer, and any combination thereof.

9. The method of claim 1, wherein said first predetermined period of time is further based on at least one personalized value associated with the image.

10. The method of claim 1, wherein said second predetermined period of time is further based on a personalized value associated with the image.

11. The method of claim 9, wherein said personalized value is based on a factor selected from the group consisting of ultraviolet light exposure, cigarette smoking exposure, pollution exposure, stress, exercise, diet, pigmentation, skin conditions, genetic disposition to aging, and any combination thereof.

12. The method of claim 1, wherein the product is a plurality of products.

13. The method of claim 3, further comprising adjacently comparing said first and second aged images.

14. The method of claim 1, wherein said first aged image and/or said second aged image is outputted to a display device, a printing device, a memory storage media, and any combination thereof.

15. The method of claim 14, wherein said first aged image and/or said second aged image is further outputted, at least in part, over the Internet.

16. The method of claim 14, wherein said first aged image and/or said second aged image is pictorially displayed on a computer screen.

17. The method of claim 1, wherein the benefit demonstrated focuses on a particular area or characteristic of the image.

18. The method of claim 17, wherein said particular characteristic of the image is selected from the group consisting of lip lines, sagging skin, fine lines, wrinkles, dark eye circles, crow's feet, pigmentation, and any combination thereof.

19. A method for aging an image via an electronic interface to demonstrate a benefit of using a personal care product, said method comprising the steps of:
   selecting the product for use;
   regressively aging the image a regressive predetermined period of time based on a product value associated with the product and/or a personalized value associated with the image; and
   outputting the regressively aged image.

20. The method of claim 19, further comprising the step of progressively aging the image a progressive predetermined period of time prior to regressively aging the image.

21. The method of claim 20, wherein said progressive predetermined period of time is based on an aging period.

22. The method of claim 21, wherein said progressive predetermined period of time is also based on the personalized value associated with the image.

23. The method of claim 20, further comprising outputting said progressively aged image and said regressively aged image to a device selected from the group consisting of a display device, a printing device, a memory storage media, and any combination thereof.

24. A computer readable program embodied in an article of manufacture comprising computer readable program instructions for aging an image to demonstrate a benefit of using a personal care product, said article of manufacture comprising program instructions for:
   selecting the product for use;
   inputting the image;
   selecting an aging period of time;
   inputting personalized data associated with the image;
   progressively aging the image a predetermined period of time; and
   outputting said progressively aged image.

25. The article of manufacture of claim 24, wherein said predetermined period of time is based on a factor selected from the group consisting of a product value associated with the product, a personalized value associated with the image, a selected aging period, and any combination thereof.

26. The article of manufacture of claim 24, further comprising program instructions for regressive aging of the image a regressive predetermined period of time.

27. The article of manufacture of claim 24, further comprising program instructions for pictorially displaying said progressively aged image.

28. An apparatus for aging an image via an electronic interface to demonstrate a benefit of using a personal care product, said apparatus comprising:
   means for progressively aging an image of the face a first predetermined period of time based on at least a selected aging period to provide a first aged image;
   means for regressively aging the image of the face a second predetermined period of time based on an anti-aging period of time associated with said personal care product to provide a second aged image; and
   means for outputting said regressively aged second image.

29. The apparatus of claim 28, wherein said first predetermined period of time is also based on a personalized value associated with the image.

30. The apparatus of claim 29, wherein said personalized value is based on a factor selected from the group consisting of ultraviolet light exposure, cigarette smoking exposure, pollution exposure, stress, exercise, diet, pigmentation, skin conditions, genetic disposition to aging, and any combination thereof.

31. The apparatus of claim 28, wherein the image is obtained at a point of sale of said product.

32. The apparatus of claim 28, wherein the image is obtained through a communications network.

33. The apparatus of claim 32, wherein the communications network is the Internet.

34. The apparatus of claim 28, wherein said first aged image and/or said second aged image is pictorially displayed on a computer screen.

35. The apparatus of claim 28, wherein the apparatus is adapted for developing new personal care products.

* * * * *